GOOLMAN & HOLTSCLAW.
Balance Scales.
No. 9,170.
Patented Aug. 3, 1852.
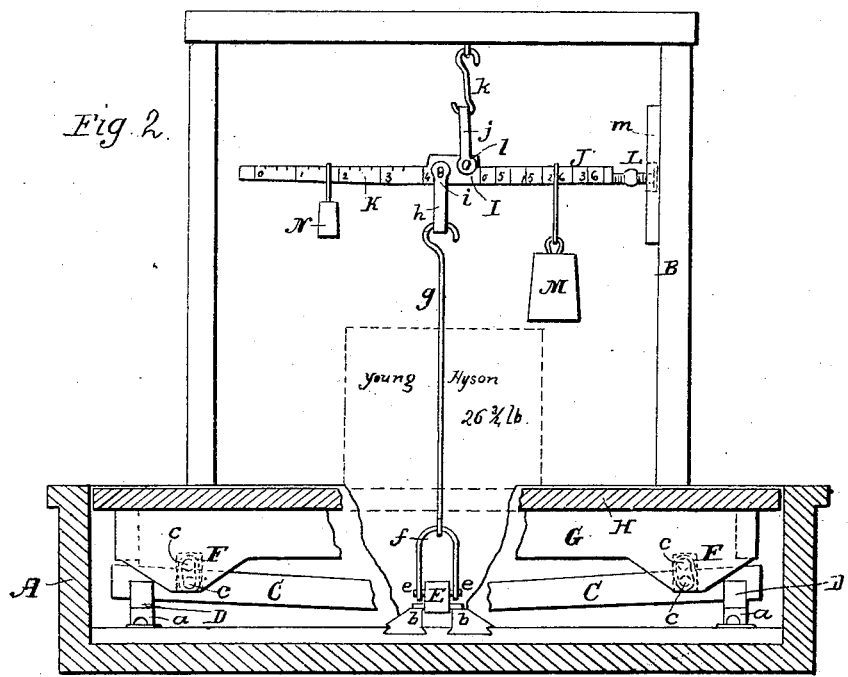
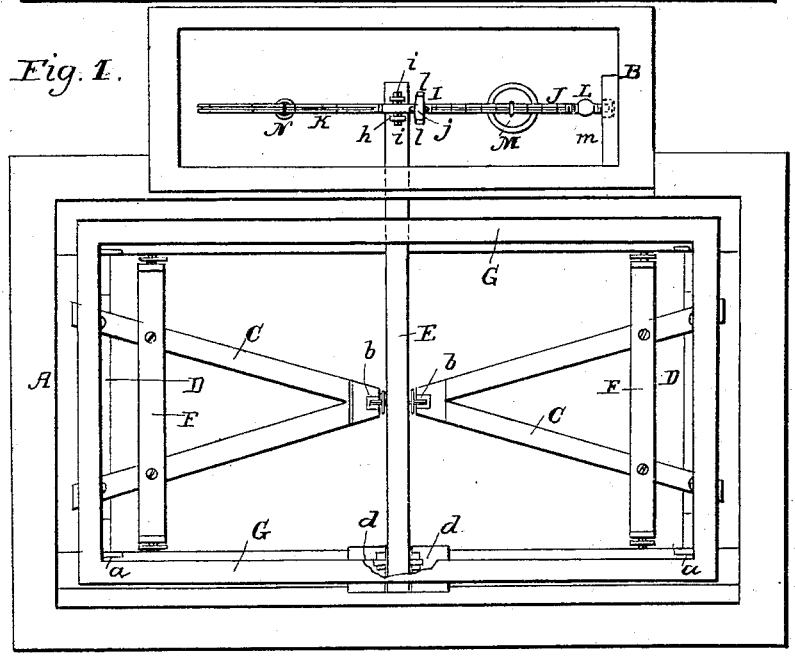

UNITED STATES PATENT OFFICE.

WM. P. GOOLMAN AND WM. HOLTSCLAW, JR., OF SPRINGTOWN, INDIANA.

SCALE FOR WEIGHING.

Specification of Letters Patent No. 9,170, dated August 3, 1852.

*To all whom it may concern:*

Be it known that we, WM. P. GOOLMAN and WM. HOLTSCLAW, Jr., of Springtown, in Hendricks county, in the State of Indiana, have invented a new and useful Improvement in Platform and other Balances; and we do hereby declare that the same is described and represented in the following specification and accompanying drawings.

The nature of our invention consists in making the weighing beam with two long graduated arms instead of one only, and applying a pea or weight to each of them, the divisions on one arm indicating pounds or tens or hundreds, &c., of pounds, according to the size of the balance, and those on the other arm the ounces, quarter-pounds or pounds or any subdivisions or fractions of the larger weights that may be desired. By this arrangement several important advantages are gained. In the first place the weights or peas are in no danger of interfering with each other, as they are liable to do when two are used on the same arm and there being comparatively few notches required on the arm where the principal part of the weight is indicated, the heavy pea belonging to this arm will slide easily from one division to another and will be much more readily adjusted than when there are numerous notches for subdivisions on the same arm. Again the numbers marking the subdivisions are entirely separate and distinct from the others, both they and the pea belonging to them being on the opposite side of the fulcrum or support of the beam; consequently there is less liability to confusion and mistake, and since not only are human faculties imperfect but unfailing care and attention are often wanting even in those employed in important transactions, this advantage must be regarded as an important one. Again the arm upon which the subdivisions or fractions are to be weighed may be made long and light and adapted to a small pea or weight so as to weigh or indicate any fraction however small of the larger divisions.

To enable others skilled in the art to make and use our improvement we will proceed to describe the construction and operation of a balance of which it forms a part, referring to the above mentioned drawings, in which the same letters indicate like parts in each of the figures.

Figure 1 is a plan of such a balance, the platform and also the top of the higher part containing the beam, being left off in the drawing in order to show the interior. Fig. 2 is an elevation of the same, the sides of both the higher and lower portion of the box or case being left off and parts broken out as indicated in order to show the arrangement and connection of the parts.

The levers, &c., through which the weight of the article to be weighed is made to act upon the weighing beam, may be constructed and arranged according to any of the modes in common use or otherwise.

In the platform balance represented A is the box or case containing the levers, platform, &c., and B a more elevated portion of the same containing the weighing beam.

C, C are two branched levers resting toward one end upon the two cross-pieces D, the pivots $a$, $a$ projecting from the ends of the cross-pieces being their fulcra, while their other ends are supported by the pivots $b$, $b$ projecting from the long lever E.

F, F are cross-pieces resting on the levers C, C and having the pivots $c$, $c$ projecting from their ends by which the frame G is supported, and upon this frame is placed the platform H.

The long lever E is supported at one end by the pivots $d$, $d$, the other being connected by the pivots $e$, $e$ resting in the stirrup $f$ and by the rod $g$ to the stirrup $h$, this stirrup being supported by the pivots $i$, $i$ on the weighing beam I, which may be made in the form represented in the drawing. The weighing beam I is itself supported by the pivots $l$, $l$ resting in the stirrup $j$ connected by the hook $k$ to a staple fastened in the top of the frame B, and it has two graduated arms J and K, the larger one, J, extending from the pivots $l$, $l$ and the smaller, K, from the pivots $i$, $i$.

On the arm J is screwed the movable weight or ball L for adjusting the balance, and the beam is kept in place by its extending into a space cut in the block $m$ attached to the side of the frame; this space being of such form and size as to allow the end of the beam to move freely up and down to a sufficient extent to show whether it is in equilibrium or inclines to rise or fall. Each arm of the beam is graduated or divided into any convenient number of equal spaces and upon the arm J is hung the large weight or pea M for indicating the larger divisions of weight, as pounds or tens or hundreds of pounds, and upon the other arm K a smaller weight or pea N for indicating the subdivisions or fractions of the larger divisions of weight. As represented in the drawing the arm J contains five-pound divisions and the arm K pound divisions subdivided by notches for quarters; but it is obvious that by varying the lengths of the arms and the number of divisions on each and adapting the size or weight of the pea for each arm to the divisions of the arm for which it is intended the extent or size of the larger divisions of weight and the minuteness of the subdivisions, as well as the relation between the two, may be varied at pleasure. The beam I should be so adjusted that when the large pea is placed at O it will so much more than counterbalance the weight of the platform, levers, &c., that when the small pea is placed at O on the opposite side of the fulcrum or support the beam shall be exactly balanced or in equilibrium. The beam being thus properly adjusted suppose an article of the weight of $26\frac{3}{4}$ lbs. to be placed upon the platform H. Its weight acting through the levers C, C upon the long lever E will bring down the arm K of the beam, raising the pea M. This pea is then to be moved out to the twenty-five pound notch, that being the farthest notch from the fulcrum at which it will be supported or overbalanced by the weight on the platform, and as the beam is then not in equilibrium the small pea on the other arm of the beam is moved in toward the fulcrum until the equilibrium is restored, which will be found to take place when this pea is brought to the notch indicating $1\frac{3}{4}$ lbs. This being added to the 25 lbs. indicated upon the other arm makes the whole weight of the article, namely $26\frac{3}{4}$ lbs., $(25+1\frac{3}{4}=26\frac{3}{4}.)$ The weighing beam may be so adjusted as to be in equilibrium with the small pea placed on the inner part of the arm or near the fulcrum or support of the beam, and the divisions or graduation must then begin at this point and count from the fulcrum toward the outer end, but in weighing with a balance so arranged the large pea must be moved out to the first notch at which it will overbalance the article on the platform and the small pea being then moved out until the equilibrium is restored, the number corresponding to the position of the small pea must be subtracted from that indicated by the large one to obtain the true weight.

We contemplate using two peas of different weight upon the smaller arm of the beam, the larger of the two to determine the subdivisions of the large divisions of weight indicated upon the other arm and the smaller to indicate subdivisions of those subdivisions for the purpose of attaining a greater degree of accuracy or for other purposes.

What we claim as our invention and desire to secure by Letters Patent is—

The making of the weighing beam of platform or other balances or scales with two graduated arms extending in opposite directions from the fulcrum of said beam and applying one or more movable weights or peas to each of them, the divisions on one arm indicating the larger divisions of weight, and those on the other any subdivisions or fractions of the larger that may be desired, substantially as herein set forth and described.

In testimony whereof, we have hereunto signed our names before two subscribing witnesses.

WM. P. GOOLMAN.
WILLIAM HOLTSCLAW, JR.

Witnesses:
JAMES WRIGHT,
STEPHEN S. KITCHEN.